May 12, 1970 — C. W. MUSSER — 3,511,079
METHOD AND APPARATUS FOR TESTING BEARINGS
Filed Dec. 19, 1966 — 3 Sheets-Sheet 1

INVENTOR
C. Walton Musser
Albert J. Duke
ATTORNEY

May 12, 1970   C. W. MUSSER   3,511,079
METHOD AND APPARATUS FOR TESTING BEARINGS
Filed Dec. 19, 1966   3 Sheets-Sheet 2

INVENTOR
C. Walton Musser
Albert F. Duke
ATTORNEY

INVENTOR
BY C. Walton Musser
Albert J. Duke
ATTORNEY

United States Patent Office 3,511,079
Patented May 12, 1970

3,511,079
METHOD AND APPARATUS FOR TESTING BEARINGS
C. Walton Musser, Palos Verdes Estates, Calif., assignor to General Motors Corporation, Detroit, Mich., a corporation of Delaware
Filed Dec. 19, 1966, Ser. No. 602,645
Int. Cl. G01n 3/56
U.S. Cl. 73—9                                                                11 Claims This invention relates to a method and apparatus for testing bearings and more particularly to a method and apparatus for imparting a controlled speed and/or load to a rolling element in a raceway. While of general utility, the apparatus of the present invention is particularly advantageous for rapidly and precisely determining the rolling coefficient of friction of a ball in a controlled environment.

When materials are subjected to hard vacuum, the decrease in pressure promotes outgassing of the materials and produces surface conditions which may be very different from those under sea level atmospheric conditions. Interfacial contact between surfaces of common structural materials which are fully clean usually bring about a comingling of molecular or elemental particles in a manner similar to welding. This not only destroys the surface continuity but gives rise to certain microscopic debris when the weldments are ruptured or torn apart by subsequent relative motion of the material in contact. Therefore, rolling, intermittently contacting and sliding surfaces present a serious problem in a hard vacuum environment. In addition the relatively high and low temperatures existing in the lunar and space environments cause thermal expansion and contraction, thermal gradients, and localized heat radiation while the high speed electrons and other particles compound the surface physic problem of the materials in contact. The problems become critical in space vehicles where portions are articulated and it is necessary to employ anti-friction bearings.

In prior art bearing test apparatus, there is usually a multiplicity of parts in contact with the ball or roller and generally, any one ball or roller is contacted by several surfaces. Furthermore, a loading mechanism is used to provide the desired contacting point load. With the multiplicity of contact points to various surfaces of the ball, the specific conditions under which the various contact points are operating cannot be determined with a high degree of accuracy. A loading mechanism usually limits the motion of the rolling element or it provides a varying load due to inaccuracies in manufacture or set up. Accordingly, the data extracted from such tests is of questionable utility.

In contrast to the prior art bearing test apparatus, the apparatus of the present invention includes means for imparting a gyratory motion to an outer race such that the center of the race moves in a circular path and utilizes the centrifugal force imparted to the mass of the rolling element to provide the desired contact loading. Furthermore, the apparatus of the present invention permits testing in which only one significant contact point exists.

An advantage obtained by using centrifugal force to load the contact surface is the extreme preciseness to which the contact forces are known. Knowing the radius of rotation, the mass of the rolling element, and the number of rotations per second, the force the rolling element exerts on the contacting raceway is directly calculable to a high degree of accuracy. Also, for a given geometry, the only variable is the revolutions per second and by synchronously driving the rolling element, all undesired variables are precluded.

The information utilized for the calculation of the coefficient of friction may be obtained from the apparatus of the present invention without any alteration or effect on the test and can be taken at any time during the running of the test. Moreover, the values obtained can be verified at any time by an entirely independent corroborating system.

In accordance with the present invention, a housing is provided which is adapted to receive a flexible reed which is secured at one end to the housing. The other end of the reed is provided with a race chuck for receiving the outer race of a bearing. Electromagnetic drive means including an armature attached to the reed is provided for imparting a circular vibration to the reed causing a gyratory motion of the race which drives the rolling element around the inner surface of the raceway. The steady state angular rate of the center of the ball with respect to the center of the race is synchronous with the frequency of the electric field and the vibration frequency of the raceway. Means are provided for measuring the amplitude of the gyrations of the race chuck and the phase angle of the rolling element to the gyratory motion of the race chuck from which the coefficient of friction can be determined. Since the reed is non-rotatably mounted to the housing, the testing of the bearing may take place in a controlled environment without the necessity for feedthrus or auxiliary bearings.

A more complete understanding of the present invention may be had from the following detailed description which should be read in conjunction with the drawings in which.

Figure 1:
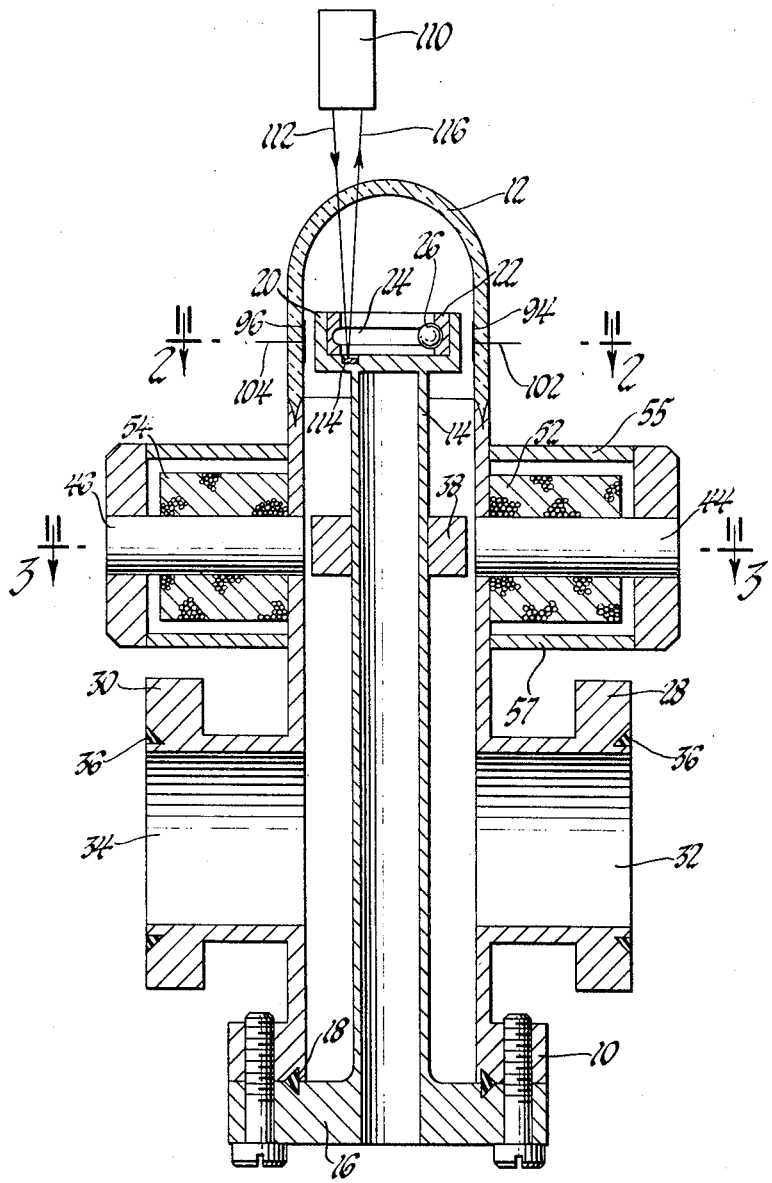
FIG. 1 is a cross sectional view of the invention taken along the axis of the bearing raceway under test.
Figure 2:
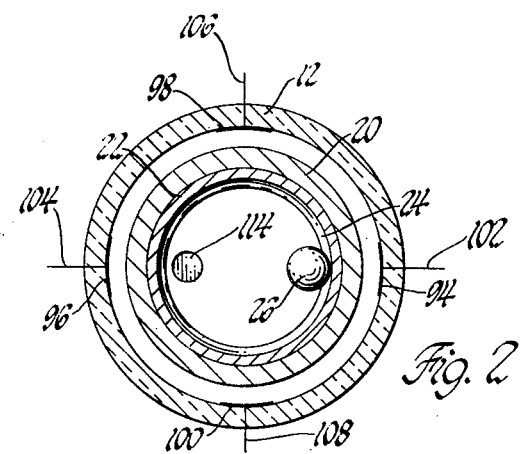
FIG. 2 is a cross sectional view taken along lines 2—2 of FIG. 1.
Figure 3:
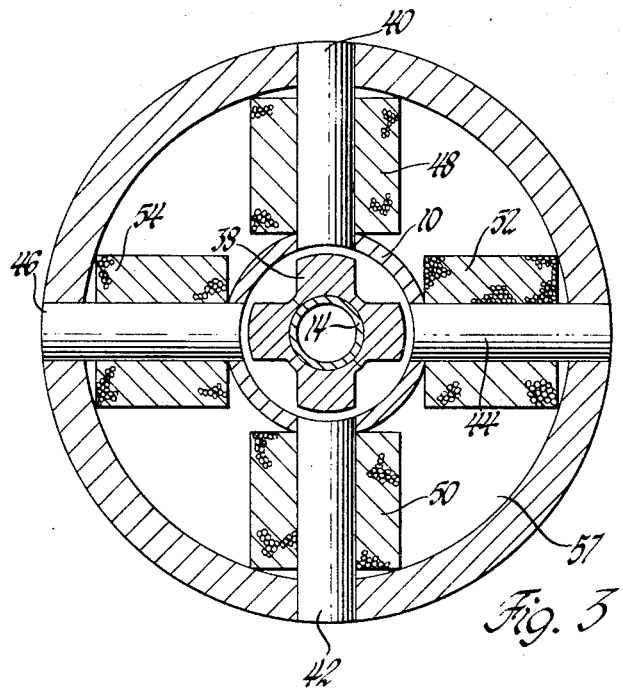
FIG. 3 is a cross sectional view taken along lines 3—3 of FIG. 1.

Referring now to the drawings and initially to FIGS. 1–3, the apparatus of the present invention includes a housing 10 having a dome-like glass window 12 fused thereto. The housing 10 is made from non-magnetic steel or other non-magnetic material. A circular reed 14 having an integral base plate 16 extends into the housing 10 and is secured thereto. The interior of the housing is sealed against leakage by a seal 18. The reed 14 is provided with an integral race chuck 20 to which an outer race 22 of a bearing is press-fitted or cemented. The outer race 22 is provided with a raceway 24 in which a ball 26 or other rolling element travels. Since it is desirable to be able to test bearings in a controlled environment such as a hard vacuum, the housing 10 is provided with flanges 28 and 30 and openings 32 and 34 for attachment to appropriate associated apparatus to maintain the desired environmental condition for the test. Seals 36 are provided to maintain a leak-proof condition within the housing 10.

An armature 38 formed of a ferro-magnetic material having a high permeability is permanently fastened to the circular reed 14 by hydrogen brazing or other standard fastening techniques. Inserted in and brazed or welded to the housing 10 are four equally spaced magnetic cores 40, 42, 44 and 46. These cores are adapted to be energized by surrounding coils 48, 50, 52 and 54, respectively. The cores and coils are held in position and physical.y protected by coil covers 55 and 57.

Figure 5:
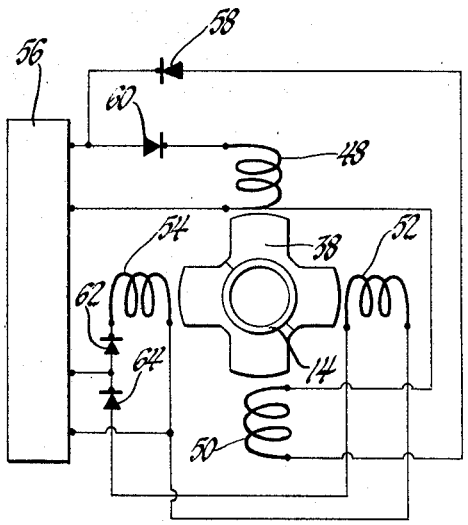
FIG. 5 is a schematic diagram of the electrical driving means.
Figure 6:
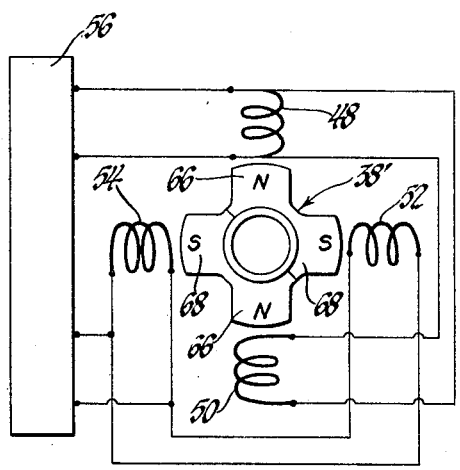
FIG. 6 is a schematic diagram of an alternative electrical driving means.

As shown in FIGS. 5 and 6, the coils 48–54 are adapted to be connected to a two-phase alternating power supply 56. Where an unpolarized armature is utilized, as shown in FIG. 5, rectifiers 58–64 are employed so that the coils 48–50 are sequentially energized. Upon energization of the coil 48, the armature 38 will be magnetically attracted toward the core 40 by a force dependent on the electric current supplied to the coil 48. With a sinusoidally varying current, the armature 38 and the circular reed 14 vibrate toward and away from the core 40 as the current values change. The armature 38 is attracted toward the core 40 as the current increases. However, since the circular reed 14 is flexible, the spring constant of the reed opposes the attractive force and limits the extent of motion. The amount of the motion is proportional to the current supplied to the coil 48. As the current sinusoidally diminishes the spring constant for the circular reed 14 tends to make it return to its relaxed or originating position. Hence, the sinusodially varying current causes the reed to vibrate back and forth in synchronism with the current variation. The same procedure follows for each of the cores 40–46. In this manner a circular vibration is set up in the armature 38 and the reed 14. This causes the ball 26 to roll around the raceway 24 at a rate dependent on the frequency of the power source. If a polarized armature 38' having north poles 66 and south poles 68 is utilized, the power supply 56 can be connected to the coils as shown in FIG. 6. It is necessary with this arrangement to hook up the coils in such manner that the polarization of opposite coils will be additive in their reaction on the armature instead of cancellatory. The two-phase power supply 56 is conventional and is capable of supplying a sinusoidal output current variable in frequency, amplitude, and phase relationship. While a two-phase power supply is shown, it will be evident that the apparatus is not limited to use with a two-phase power supply. By appropriate use of a different number of coils or other electrical apparatus a different number of phases can be used to produce the desired controlled circular vibration of the reed 14.

Figure 8:
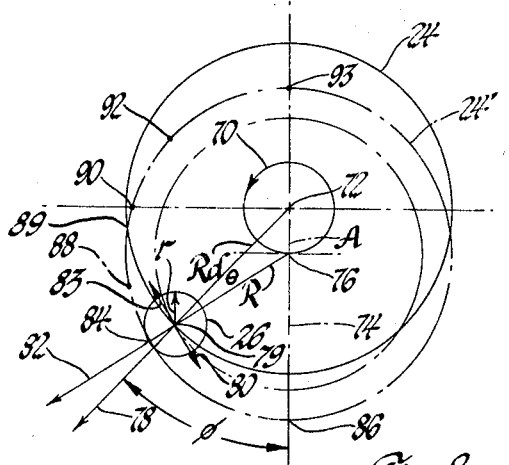
FIG. 8 illustrates the driving principle utilized in the present invention and the forces acting on the ball.

To explain the inherent stability of the system reference will now be made to FIGS. 8, 9 and 10. Referring first to FIG. 8, when the reed 14 is vibrated in a circular path, the gyratory motion of the reed 14 is transferred to the race 22 and is depicted by the circular arrow 70. The amplitude or radius of this motion is indicated by the line A at the instant when the original center 72 of the race 22 crosses the vertical center line 74 at the instantaneous center 76 of the race 22. The original center 72 is the center of the circular reed 14 and the raceway 24 when the system is at rest. This is also the center of the circular path in which the rolling element 26 will rotate when it has reached a stabilized condition. The circles 24 and 24' are shown around the centers 72 and 76, respectively and represent the raceway 24 and its stabilized and dynamic gyratory modes.

The circle 24' is illustrated as having a radius R drawn through the center of the rolling element 26. The centrifugal force designated 78 acting on hte rolling element 26 is along the line designated $R_d$ connecting the originating center 72 and the center 79 of the rolling element 26. The centrifugal force 78 includes a tangential component 80 and a normal component 82. The frictional force between the rolling element 26 and the raceway 24' is designated 83 and is shown as applied at the center 79 of rolling element 26 in a direction opposite to its motion and perpendicular to the normal component 82. At any position of rolling element 26, an angle $\theta$ is produced which is the angle of the instantaneous effective inclined plane upon which the element 26 is rolling. An angle $\phi$ is also produced which represents the phase relationship between the line A and the line $R_d$ along which the centrifugal force 78 acts. At any angle $\phi$ the element 26 contacts the race 24' at a single contact point 84.

Figure 9:
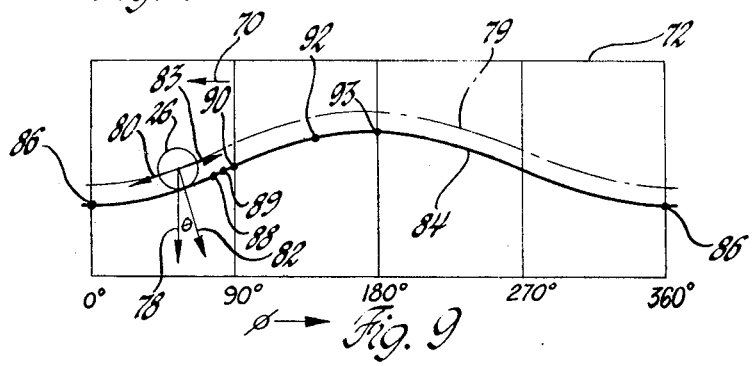
FIG. 9 is a developed view of the angular slope acting on the rolling element.
Figure 10:
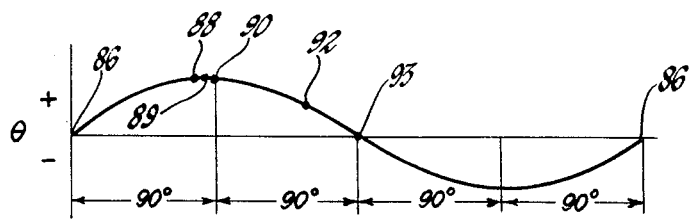
FIG. 10 is a graph showing the manner in which the angle of the inclined plane on which the rolling element travels varies with the phase angle.

Referring to FIG. 9 there is shown a graph of the radial distance from original center 72 and contact point 84 (full line) or the center 79 (dotted line) of rolling element 26. Thus, FIG. 9 gives the locus of point 84 or center 79 at all phase angles $\phi$. The graph of FIG. 9 may be considered as analogous to one representing a ball rolling down a surface under the force of gravity equal to the cenntrifugal force 78. The curve of FIG. 10 shows the variation of angle $\theta$ with angle $\phi$.

The stability of rolling element 26 at any phase angle $\phi$, from $\phi=0$ to $\phi=360°$, may be determined from an analysis of the significant forces acting on the element 26 at the particular phase angle. This phase angle is measured clockwise in FIG. 8 beginning at line A extended. By considering FIGS. 8, 9 and 10, it will be apparent that rolling element 26 is in the condition of stable equilibrium at only one particular phase angle $\phi$. This particular phase angle $\phi$ exists only in the quadrant shown in FIG. 8 at a location where the frictional force 83 and tangential force component 80 are equal and opposite. At this point the rolling element speed and $\phi$ remain constant if the centrifugal force 78, the amplitude of gyratory motion A, and the frictional force 83 remain constant. Under these conditions rolling element 26 will continue to roll on raceway 24' in the same direction as circular arrow 70 at a uniform speed corresponding to the frequency of raceway gyration.

For purposes of a more detailed explanation, additional points of contact of the element 26 with the raceway 24' are designated 86, 88, 89, 90, 92 and 93. At points 86 or 93 the angle $\theta$ is zero and tangential force component 80 is zero. Therefore, at points 86 and 93 there is no tangential force to move element 26 in either direction. Starting at the left hand end of FIG. 9 at point 86 and moving to the right or clockwise on FIG. 8 toward point 93, tangential component 80 and frictional force 83 act in opposite directions for positions of element 26 from $\phi$ greater than 0° to $\phi$ less than 180°. However, tangential component force 80 which depends on angle $\theta$, the amplitude of gyratory motion A, and centrifugal force 78, increases gradually from zero at point 86 to a maximum at point 89 just short of point 90, and then decreases gradually to zero at point 93. Similarly frictional force 83 which depends on friction coefficient and centrifugal force 78 goes from a maximum at point 86 to a slightly smaller value at point 93. This is because radius $R_d$ which determines centrifugal force 78 is slightly greater at contact point 86 ($\phi=0°$) then it is at contact point 93 ($\phi=180°$). Between contact points 86 and 93 frictional force 83 essentially decreases gradually. It is apparent that there is a point such as 88 at a particular phase angle $\phi$, between points 86 and 90 where component force 80 and frictional force 83 are equal and opposite. This point 88 is the point of equilibrium, i.e., the speed of rolling element 26 and the magnitude of phase angle $\phi$ will remain constant at point 88 if the centrifugal force 78, the amplitude of gyratory motion A, and thef rictional force 83 are constant.

If element 26 is displaced from point 88 toward point 90, component force 80 increases and frictional force 83 essentially decreases. Thus, a moment is created which tends to return element 26 to point 88. Similarly, if element 26 is displaced from point 88 toward point 86, component force 80 decreases and frictional force 83 increases tending to return element 26 to point 88. Therefore, point 88 or the corresponding $\phi$ defines a position of stable equilibrium for element 26. The rolling element 26 will continue to roll at a uniform speed in raceway 24' regardless of small changes in the particular weight and/or shape of the element 26 and the friction coefficient. The lubricants used or the surface conditions may also change to some extent without disturbing the equilibrium of the rolling element 26. However, phase angle $\phi$ will change to compensate or $\phi$ may be changed by changing the amplitude of gyratory motion, and/or the centrifugal force by increasing or decreasing the system input frequency.

Similarly, there is some point 92 between points 90 and 93 where component force 80 and frictional force 83 are again equal and opposite. This point is then another point of equilibrium, however, point 92 defines a position of unstable equilibrium. This is because displacement of rolling element 26 toward point 90 causes component force 80 to increase more rapidly than frictional force 83, further displacing element 26 toward point 90 and from there to point 88. Also, displacement of element 26 toward point 93 causes component force 80 to decrease and force 83 to decrease less rapidly, further displacing element 26 toward point 93. Moving from point 93 to the right on FIG. 9 and clockwise on FIG. 8 toward point 86 with element 26 located at a phase angle $\phi$ greater than 180° but less than 360° component force 80 and frictional force 83 act in the same direction. It becomes apparent therefore, that in this region element 26 will have a moment which tends to move it to point 86. Therefore, there is no position of equilibrium of rolling element 26 for $\phi$ between 180° and 360°.

Figure 11:
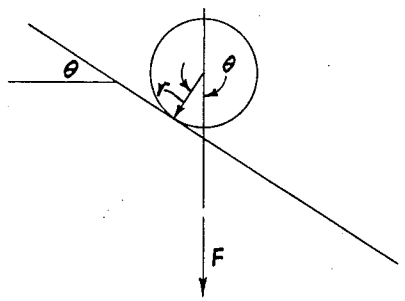
FIG. 11 is a diagram of the rolling element on an inclined plane and demonstrates the driving torque applied to the rolling element.

Referring now to FIG. 11, if a force F acts on a rolling element at an angle $\theta$ with the surface upon which it is rolling, the torque tending to rotate the rolling element can be expressed by the formula:

(1) $$T = \sin \theta r F$$

where:

T = Torque in pound inches
$\theta$ = Angle between force line F and normal-to-the-surface line in degrees
r = Radius of rolling element in inches
F = Force in pounds The coefficient of rolling friction can be expressed as the torque divided by the normal force, or $$CF = \frac{\sin \theta r F}{\cos \theta F} = \tan \theta r$$

From FIG. 8 it can be seen that $$\sin \theta = \frac{A \sin \phi}{R - r}$$

where:

A = Amplitude of gyratory motion in inches
$\phi$ = Phase angle between ball center and gyratory motion in degrees
R = Radius of raceway in inches
r = Radius of ball in inches As a simplification with no significant error for the values normally used, the tangent of $\theta$ closely approximates the sine of $\theta$. Substituting in Equation 3:

$$\tan \theta = \frac{A \sin \phi}{R - r}$$

Substituting (4) in (2):

$$CF = \frac{A \sin \phi}{R - s}$$

Hence, it can be seen that if the radius of the raceway 24 and the radius of the rolling element 26 are known, the coefficient of friction is a function of the amplitude of gyration and the phase angle $\phi$. By adjusting the system to fix either of these, the coefficient of friction becomes directly a function of the other. Normally, it appears desirable to fix the phase angle $\phi$ by adjusting the amplitude and then accurately determining the amplitude to ascertain the friction coefficient.

Referring again to FIGS. 1 and 2, four capacitance plates 94-100 are vacuum deposited on the interior glass surface of the window 12 and are connected to fused-in glass terminals 102-108, respectively. The capacitance plates 94-100 are utilized as pick ups for measuring the amplitude of gyration. A photoelectric unit 110 includes a light source for radiating a beam 112 which is reflected from a reflector 114 located on the race chuck 20. The reflected beam 116 impinges upon a photocell located within the photoelectric unit 110. As the ball 26 rolls around raceway 24, at one point in its path it crosses over the reflector 114 and masks the light beam 112 to interrupt the reflected light beam 116. Hence, the ball 26 will cause actuation of the photoelectric unit 110 at some discreet angular relationship with the static centerline of the circular reed 14 each time it rotates around the raceway 24. The actuation of the photoelectric unit 110 is utilized for detecting the phase relationship of the ball 26 with the gyratory motion of the race chuck 20.

Figure 4:
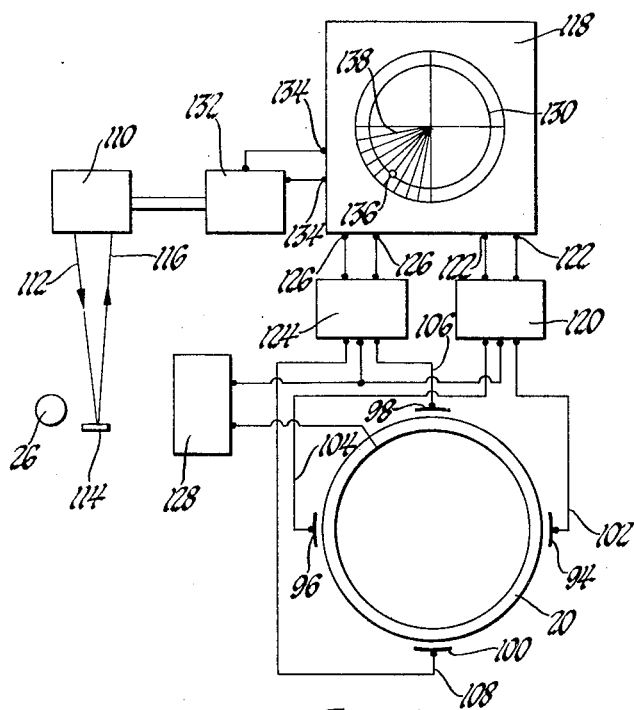
FIG. 4 is a schematic block diagram of the electrical apparatus used to ascertain the coefficient of friction.

Referring now to FIG. 4, an oscilloscope 118 provides a visual indication of both the amplitude of gyration of the race chuck 20 and the phase relationship between the ball 26 and the gyratory motion of the race chuck 20. The terminals 102 and 104 are connected to a discriminator circuit 120 which is connected to the vertical input terminal 122 of the oscilloscope 118. The terminals 106 and 108 are connected to a discriminator circuit 124 which is connected to the horizontal input terminal 126 of the oscilloscope 118. A high frequency signal generator 128 is connected to the discriminator circuits 120 and 124. The capacitors formed by the race chuck 20 and the plates 94-100 are a part of the tank circuit of the generator 128 and the variation in capacitance caused by the gyration of the race chuck 20 modulates the frequency of the output signal. The discriminator circuits 120 and 124 rectify the signal and feed the desired amplitude of the signal to the oscilloscope 118. In this manner, circular gyrations of the race chuck 20 produce a circular trace 130 on the oscilloscope screen. Thus, the amplitude and contour of the gyratory motion of the race chuck 20 is directly readable from the trace 130 during a test without interference with the test.

The phase relationship of the ball 26 with the gyratory motion of the race chuck 20 is determined by modulation of the Z or intensity axis of the oscilloscope 118. When the reflected beam 116 is interrupted by the ball 26, a sharp signal is generated by a pulse generator 132 and fed to the Z axis terminals 134 of the oscilloscope 118. This causes a bright dot 136 to form on the oscilloscope trace 130. The angular position of the dot 136 indicates the phase angle of the ball 26 to the gyratory motion of the race chuck 20 from which the trace 130 is formed. The angular lines 138 on the oscilloscope screen permit ready observation of the phase angle.

In use the diameter of the trace 130 for a given setting of the controls, indicates the amplitude of the gyratory motion of race chuck 20 and the angular position of the dot 136 indicates the phase angle $\phi$. The amount of energy available to drive the ball 26 is a function of the amplitude, and the phase angle $\phi$ indicates the percentage of this energy needed to overcome rolling fraction. Hence, by knowing the theoretical effect of each and their relationship as an occasional check, the amplitude can be changed to see whether the appropriate phase angle automatically occurs.

Figure 7:
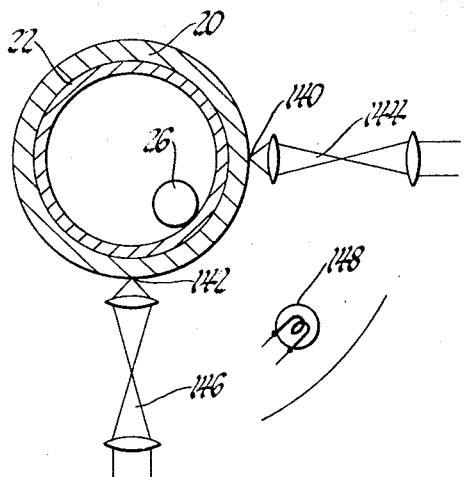
FIG. 7 is an alternative or corroborating system for ascertaining the necessary information for determining the coefficient of friction.

A completely independent check for amplitude and phase angle is shown in FIG. 7. It can be used to calibrate and occasionally check the system described above. It is somewhat more difficult to use, but permits extreme preciseness in measurement. Two extremely fine lines located 90° apart are engraved on the side of the race chuck 20 at points 140 and 142. Two microscopes 144 and 146 are positioned so that these lines can be accurately observed through the glass window 12. A stroboscopic light 148 is placed so that it will illuminate the fine lines at points 140 and 142 as well as the ball 26. The light 148 is energized from the power source 56; however, a phase shifter may be utilized so that the light can be made to flash at any portion of the cycle. This allows the fine line at the points 140 and 142 to be observed throughout their entire excursion and by careful manipulation of the phase shift control and careful observation of the micrometer eyepiece on each microscope, the amplitude can be precisely ascertained. By setting the phase control to place the fine line in the center of its amplitude, where it has the greatest sensitivity, the phase position of the rolling element can be accurately observed.

While no mention has been made as to means for starting of the apparatus, this may be accomplished in a number of ways. One way is to bring the ball or rolling element into synchronism by a tangential blast of air after which it continues to run as above described. Where it is desired to operate in a vacuum or other hostile environment, the apparatus may be started and run at a slow speed before being subjected to the hostile environment and then brought up to speed by increasing the frequency of the power supply.

It will be apparent from the above description that we have provided apparatus whereby a rolling element can be made to roll around the inside of a raceway without any contacting loading or driving mechanism and that the velocity of the rolling element and the force of contact between the rolling element and the raceway may be varied as desired by changing the frequency of the power source. Furthermore, the present invention provides apparatus for determining the coefficient of friction between two bearing elements to a high degree of accuracy without interference with the test and permits testing of the bearing elements in a hard vacuum or other hostile environment.

While the invention has been described with regards to a preferred embodiment thereof, modifications and variations will now occur to those skilled in the art. For a definition of the invention, reference is made to the appended claims.

In the claims:

1. Bearing test apparatus comprising a flexible member having one end fixed and the other end provided with means for supporting an outer race of a bearing, and drive means for imparting a controlled circular gyratory motion to said outer race.

2. The apparatus defined in claim 1 wherein said drive means includes an armature affixed to said flexible member, and a plurality of electromagnets symmetrically mounted around said armature.

3. The apparatus defined in claim 2 further including a housing, said flexible element extending into said housing, and means securing and sealing said one end of said flexible element to one end of said housing, a radiant energy passing closure member secured to the other end of said housing, said housing including means for attachment to auxiliary apparatus for providing a controlled environment within said housing.

4. Apparatus in accordance with claim 3 wherein said plurality of electromagnets comprise four electromagnets.

5. Apparatus in accordance with claim 4 wherein said flexible member is a hollow reed having an integral base portion at said one end and an integral race chuck at said other end.

6. Bearing test apparatus comprising in combination support means, a flexible member having one end fixed to said support means, a bearing race secured to the other end of said flexible member, a bearing ball, said race including a raceway providing a path of travel for said bearing ball, drive means for imparting a circular gyratory motion to said race to drive said bearing ball in said raceway.

7. Apparatus in accordance with claim 6 further comprising first detector means for detecting the phase relationship of said ball with the gyratory motion of said race, and second detector means for detecting the amplitude of said gyratory motion.

8. Apparatus in accordance with claim 7 wherein said race is secured to a race chuck integrally formed at said other end of said flexible element, a reflector formed on said race chuck, said reflector being masked by said ball during rotation thereof in said raceway, said first detector means including a source of radiant energy directed into the path of travel of said ball, photoelectric means responsive to said radiant energy and to the interruption thereof by said rolling element, said second detector means including two pairs of spaced capacitor plates fixedly mounted adjacent said race chuck.

9. A method of driving the rolling element of a bearing in the raceway of an outer race of the bearing comprising the steps of mounting the race on an elongated, nonrotatable, flexible element, and subjecting said flexible element to a controlled circular vibration to impart a circular gyratory motion to said race.

10. A method of loading a bearing comprising the steps of mounting the outer race of the bearing on an elongated, nonrotatable, flexible element, initiating rolling movement of the rolling element of the bearing in the raceway of said outer race, subjecting said flexible element to a controlled circular vibration to maintain rotation of said rolling element in said raceway and to impart a centrifugal force to the mass of the rolling element to provide the desired loading.

11. A method of measuring the rolling friction coefficient between a ball and the raceway of an outer race of the bearing comprising the steps of mounting the race on an elongated, nonrotatable, flexible element, imparting a circular gyratory motion to the race to synchronously drive the ball around the raceway with a fixed phase angle relationship existing between the location of the ball and the gyratory motion, detecting the amplitude of the gyratory motion, and computing the rolling coefficient of friction as a function of the amplitude of said gyratory motion.

References Cited

UNITED STATES PATENTS

| | | | |
|---|---|---|---|
| 3,023,604 | 3/1962 | Gordon et al. | 73—2 |
| 3,026,719 | 3/1962 | Kopczynski | 73—432 XR |
| 3,194,051 | 7/1965 | Schnoll | 73—9 |
| 3,201,981 | 8/1965 | Barnard | 73—9 XR |
| 3,324,708 | 6/1967 | Staph et al. | 73—9 |

S. CLEMENT SWISHER, Primary Examiner

J. NOLTON, Assistant Examiner

PO-1050
(5/69)

UNITED STATES PATENT OFFICE
CERTIFICATE OF CORRECTION

Patent No. __3,511,079__  Dated __May 12, 1970__

Inventor(s) __C. Walton Musser__

It is certified that error appears in the above-identified patent and that said Letters Patent are hereby corrected as shown below:

Column 4, line 22, "$\phi$, from $\phi = 0$" should read -- $\phi$, from $\phi = 0°$ --. Column 5, line 50, insert -- (2) -- before the equation; line 54, insert -- (3) -- before the equation; line 67, insert -- (4) -- before the equation; line 71, that equation reading $$CF = \frac{A \sin \phi}{R - s} \quad \text{should read} \quad CF = \frac{A \sin \phi \; r}{R - r}$$

SIGNED AND
SEALED
SEP 22 1970

(SEAL)
Attest:

Edward M. Fletcher, Jr.
Attesting Officer

WILLIAM E. SCHUYLER, JR.
Commissioner of Patents